United States Patent [19]
Harris

[11] Patent Number: 5,449,018
[45] Date of Patent: Sep. 12, 1995

[54] FLOW CONTROL VALVE

[75] Inventor: Robert S. Harris, Connersville, Ind.

[73] Assignee: Stant Manufacturing Inc., Connersville, Ind.

[21] Appl. No.: 177,176

[22] Filed: Jan. 4, 1994

[51] Int. Cl.⁶ ............................................. F16K 17/196
[52] U.S. Cl. .................... 137/493.9; 137/43; 137/859; 220/746
[58] Field of Search ............ 137/43, 493.9, 587, 137/859; 220/746

[56] References Cited

U.S. PATENT DOCUMENTS

| | | | |
|---|---|---|---|
| 3,827,456 | 8/1974 | Sheppard | 137/859 |
| 3,929,158 | 12/1975 | Rodgers | 137/493.9 |
| 4,113,300 | 9/1978 | Schenk | 137/859 X |
| 4,760,858 | 8/1988 | Szlaga | |
| 4,953,583 | 9/1990 | Szlaga | |
| 5,099,880 | 3/1992 | Szlaga et al. | |
| 5,156,178 | 10/1992 | Harris | |

Primary Examiner—Robert G. Nilson
Attorney, Agent, or Firm—Barnes & Thornburg

[57] ABSTRACT

An apparatus is provided for controlling venting of fuel vapors from a vehicle fuel tank. The apparatus includes a housing having an inlet receiving fuel vapor from the fuel tank and an outlet discharging vapor to a vapor treatment device and a valve having a central portion and an outer annular portion. The valve is movable in the housing and cooperates therewith to define a first vent chamber communicating with the fuel tank and a second vent chamber communicating with the vapor treatment device. A first vent opening is formed in the central portion of the valve. The apparatus also includes a member partitioning the first vent chamber into a central region exposed to pressure from the second vent chamber and an outer annular region exposed to pressure from the inlet. A spring normally biases the valve into engagement with the partitioning member to block flow of fuel vapor from the outer annular region of first vent chamber through the first vent opening to the second vent chamber.

43 Claims, 2 Drawing Sheets

FLOW CONTROL VALVE

BACKGROUND AND SUMMARY OF THE INVENTION

The present invention relates to an apparatus for controlling venting of fuel vapor from a vehicle fuel tank. More particularly, the present invention relates to a venting apparatus adapted to use pressurized fuel vapor from the fuel tank to initiate fuel vapor venting to a fuel vapor treatment device.

Vehicle fuel tanks are typically equipped with devices for venting fuel vapor from the fuel tank to a remote vapor treatment device. Well-designed venting devices rapidly vent large volumes of fuel vapor from the fuel tank in response to fuel vapor pressure buildup in the tank. Such devices also minimize fuel vapor venting during conditions in which venting would be undesirable, such as during vehicle refueling or during an emergency such as vehicle rollover. Venting devices are also preferably designed to open during development of sub-atmospheric pressure in the fuel tank to allow ambient air to flow into the fuel tank to return tank pressure to acceptable levels.

Designers have proposed various head valve arrangements in an attempt to provide a fuel vapor control valve that opens and closes quickly in response to changes in fuel vapor pressure conditions in the fuel tank. It is known to position a head valve so that pressurized fuel vapor in the fuel tank reaches the head valve and moves the head valve away from a "closed" vent-blocking position to an "opened" position to allow venting of pressurized fuel tank vapor. As the fuel vapor continues to vent, the pressure decreases and the head valve returns to its closed, vent-blocking position. For example, in U.S. Pat. No. 4,760,858 to Szlaga, a ball is used as a head valve.

Designers have also attempted to provide vacuum-assisted fuel vapor-venting assemblies. These assemblies depend upon an external source of vacuum to lift the valve off its valve seat rather than relying upon the pressure head developed by the fuel vapor in the fuel tank. For example, in U.S. Pat. No. 5,156,178 to Harris, an engine-controlled diaphragm valve is used in which the upper side of the diaphragm valve is exposed to vacuum from a vacuum source when the engine is running.

It would be desirable to provide a venting assembly including an improved head valve which moves rapidly to vent relatively large amounts of fuel vapor whenever the fuel vapor pressure in the fuel tank reaches a set level. It would further be desirable to provide a venting assembly including an improved head valve with a vacuum assist.

According to the present invention, an apparatus is provided for controlling venting of fuel vapor from a vehicle fuel tank. The apparatus includes a housing, a valve movable in the housing, a partitioning member, and a spring normally biasing the valve into engagement with the partitioning member. The housing is formed to include an inlet for receiving fuel vapor from the vehicle fuel tank and an outlet for discharging fuel vapor to a vapor treatment device. The valve cooperates with the housing to define a first vent chamber receiving fuel vapor from the fuel tank by way of the inlet and a second vent chamber discharging fuel vapor to the outlet and exposed to pressure from the vapor treatment device.

Thus, the pressure in the first vent chamber is generally equal to the fuel vapor pressure in the fuel tank, while the pressure in the second vent chamber is generally equal to the pressure at the vapor treatment device, which is atmospheric when the vehicle engine is off and slightly sub-atmospheric when the vehicle engine is on. The valve includes a central portion, an outer annular portion, and a first vent opening formed in the central portion to communicate fuel vapor from the first vent chamber and the second vent chamber.

The partitioning member is positioned in the first vent chamber for engagement with the valve. When the valve engages the partitioning member, flow of fuel vapor from the first vent chamber to the second vent chamber through the opening is blocked. The partitioning member partitions the first vent chamber into a central region exposed to pressure from the second vent chamber and an outer annular region exposed to fuel vapor pressure from the inlet. The partitioning member is formed to include an opening providing a flow path between the inlet and the outer annular region.

Thus, advantageously, the valve may be said to be "atmospherically balanced" in that the central portion of the valve is exposed on one side to the pressure in the second vent chamber, which is normally atmospheric or sub-atmospheric, and on the other side to pressure in the central region, which is also atmospheric because the central region always remains in fluid communication with the second vent chamber. The outer annular portion of the valve is exposed on one side to pressure in the outer annular region (usually tank pressure) and on the other side to pressure in the second vent chamber (atmospheric or slightly sub-atmospheric). By thereby "balancing" the valve across its central portion and allowing pressure imbalance across the outer annular portion of the valve, the valve's opening point (the point at which it disengages from the insert in response to buildup of fuel vapor pressure in the outer annular chamber) can be more readily controlled so that high volumes of fuel vapor can be vented from the first vent chamber to the second vent chamber and subsequently to the vapor treatment device at relatively high rates.

In another aspect of the present invention, the partitioning member is formed to include a relief valve chamber, and the apparatus further comprises a vacuum-relief valve movable in the relief valve chamber between a closed position blocking flow between the relief valve chamber and the central region and an open position allowing flow between the relief valve chamber and the central region. Advantageously, when the fuel vapor pressure in the fuel tank drops to below a predetermined level, the vacuum-relief valve moves to the open position to allow ambient air to flow from the second vent chamber to the central region and to the relief valve chamber, passing from there through the inlet to the fuel tank.

In accordance with yet a further aspect of the invention, a first and a second spring plate are disposed on either end of the spring and the apparatus further comprises means for moving the first spring plate relative to the second spring plate. Thus, advantageously, the tension on the spring can be adjusted to precisely establish the opening point of the valve.

In other aspects of the present invention, the atmospherically-balanced vent valve comprises a diaphragm head valve having a vent opening formed in its central portion. One side of the diaphragm head valve is normally exposed to pressure communicated from the fuel vapor treatment device. This pressure is substantially atmospheric when the engine is off, but may be slightly sub-atmospheric when the engine is running because a light vacuum is applied through the fuel vapor treatment device.

The other side of the diaphragm head valve is exposed to fuel vapor pressure from the fuel tank across its outer portion and pressure from the fuel vapor treatment device across its central portion. That is, both sides of the diaphragm are exposed to pressure from the fuel vapor treatment device across the central portion, thus "atmospherically balancing" the diaphragm head valve.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWING

The detailed description refers particularly to the accompanying figures in which.

DETAILED DESCRIPTION OF THE DRAWINGS

Figure 1:
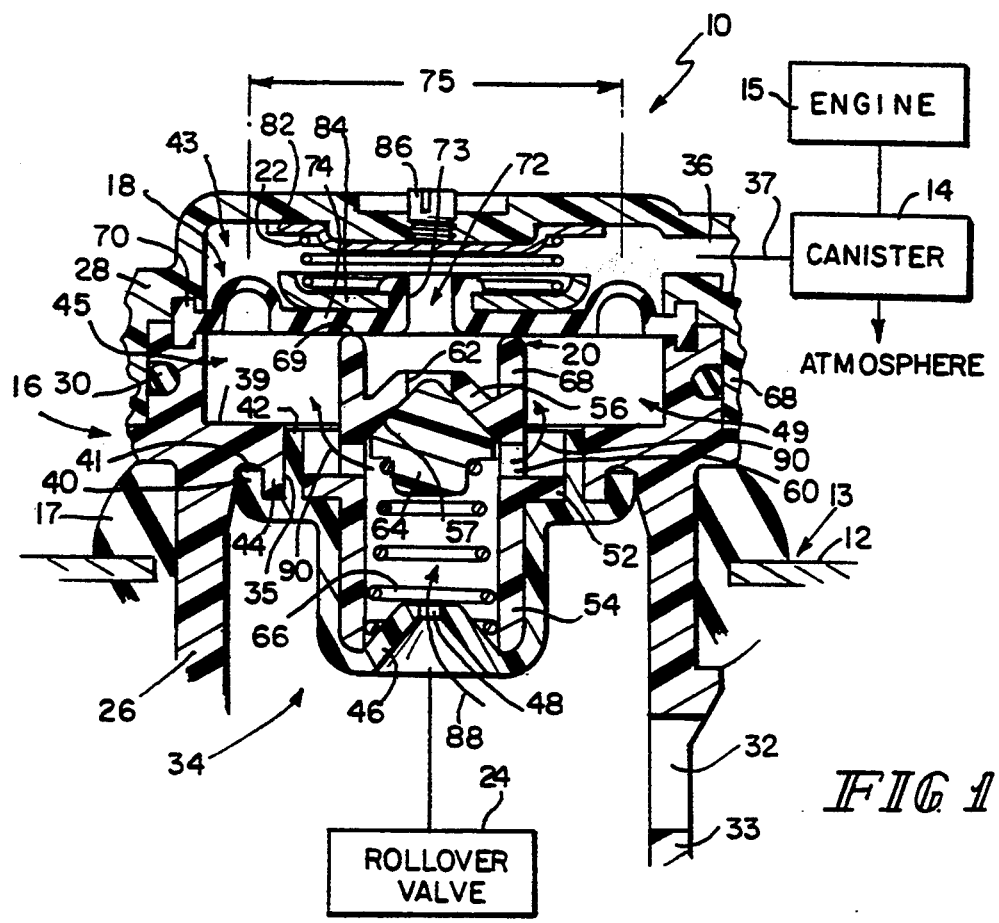
FIG. 1 is a sectional view of an apparatus in accordance with the present invention showing a valve in its closed, non-venting position as during vehicle operation at relatively low fuel tank vapor pressures.
Figure 2:
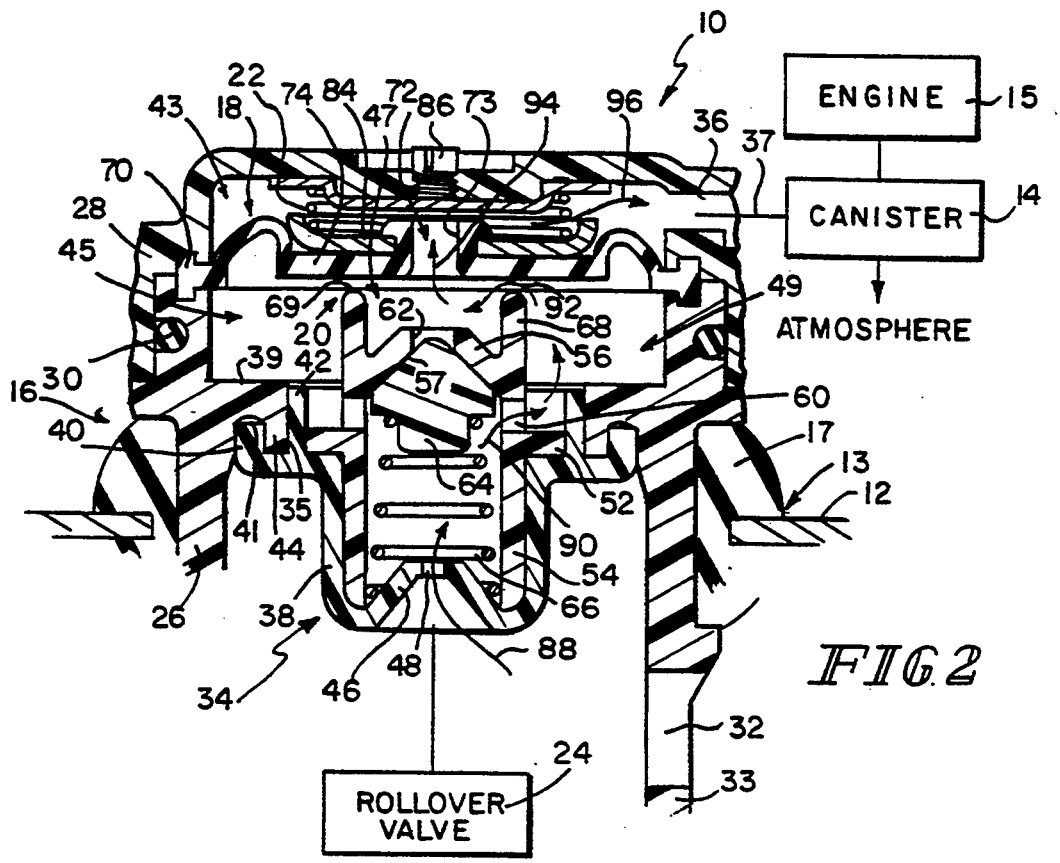
FIG. 2 is a view similar to that of FIG. 1 showing the valve moved to its open, venting position allowing fuel vapor to vent from the fuel tank as during vehicle operation at relatively high fuel tank vapor pressures.
Figure 3:
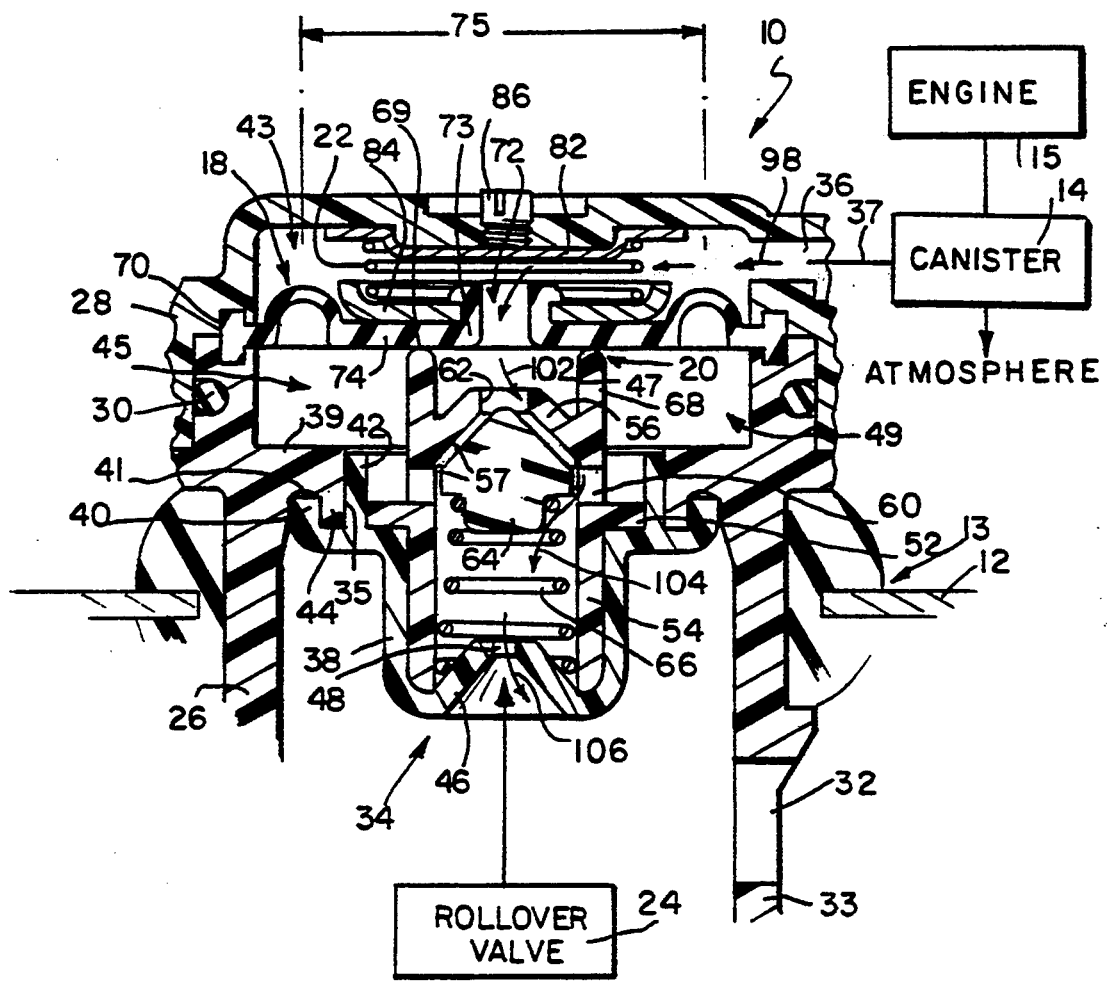
FIG. 3 is a view similar to that of FIG. 1 showing a vacuum-relief valve moved away from its seat in response to the development of sub-atmospheric fuel vapor pressure in the fuel tank.

An apparatus in accordance with the present invention for controlling venting of fuel vapor from a vehicle fuel tank is illustrated in FIGS. 1-3. Apparatus 10 is mounted in an opening formed in a top wall 12 of a fuel tank 13 as shown in FIG. 1. Apparatus 10 is connected to a canister 14 or other vapor treatment device. Fuel vapor venting from fuel tank 13 through apparatus 10 is discharged to canister 14, and in turn is vented to the atmosphere. Thus, the pressure in canister 14 is normally approximately atmospheric. However, when the vehicle engine 15 is in operation, the engine 15 applies a slight vacuum to canister 14 to recover excess fuel vapor therefrom for reuse in the engine 15.

Apparatus 10 includes a housing 16, a valve 18 movable in housing 16, an insert or partitioning member 20 providing a flow guide, and a spring 22 normally biasing valve 18 downwardly into engagement with the underlying insert 20. Apparatus 10 also includes an optional rollover valve 24. Rollover valve 24 may be a float-type rollover valve, or may be any of a variety of commercially available valves commonly adapted for use as rollover valves, such as a ball-and-ramp valve.

A gasket 17 is used to establish a sealed connection between housing 16 and the top wall 12 of the fuel tank 13. A lower housing portion 26 of housing 16 extends into the fuel tank 13 while an upper housing portion or cap 28 is positioned outside of the fuel tank 13. An O-ring gasket 30 is disposed between lower housing portion 26 and upper housing portion 28 to provide a seal between portions 26, 28 to prevent the escape of fuel vapor.

Lower housing portion 26 is formed to include at least one opening 32 providing an inlet for fuel vapor from the fuel tank 13. Illustratively, opening 32 is formed in a side wall 33 of the lower housing portion 16. Inlet 32 communicates fuel vapor from the fuel tank 13 to a rollover valve chamber 34 inside lower housing portion 16.

Upper housing portion 28 is formed to include an outlet 36. Outlet 36, as shown, communicates fuel vapor from a region above valve 18 to a vapor line 37 which leads to canister 14. Thus, the pressure at outlet 36 (and in line 37) is substantially equal to the pressure in canister 14. That is, when the vehicle engine is not operating, the pressure at outlet 36 is substantially atmospheric. When the vehicle engine is operating, the pressure at outlet 36 is slightly sub-atmospheric due to the low level of vacuum applied by engine 15 to canister 14.

Housing 16 further includes a radially inwardly-extending annular wall 39 having a central opening 35 and a downwardly opening annular groove 41 and an adjacent circumferential rim 44. A foundation 38 is positioned in snap-fitting engagement with interior wall 39. Foundation 38 includes an annular outer rim 40 received in annular groove 41 and an annular inner rim 42 which extends into the central opening 35. Foundation 38 includes an upwardly extending conical portion 46 providing a valve seat for underlying rollover valve 24. Conical portion 46 is formed to include an opening 48 allowing passage of fuel vapor therethrough from the fuel tank 13 along a path toward the valve 18.

Housing 16 defines an interior region which is partitioned into an upper vent chamber 43 above valve 18, a lower vent chamber 45 below valve 18, and a rollover valve chamber 34 below annular wall 39. Upper vent chamber 43 communicates with canister 14 via housing outlet 36 and line 37 and is defined at its upper side by an inner wall of upper housing portion 28 and at its lower side by valve 18. Lower vent chamber 45 is defined at its upper side by the underside of valve 18 and at its lower side by foundation 38. Lower vent chamber 45 receives venting fuel vapor from rollover valve chamber 34 by way of opening 48. Rollover valve chamber 34 is defined at its upper side by foundation 38 and at its lower side by a standard retainer or base (not shown), and is exposed to fuel vapor pressure from the fuel tank communicated via opening 32.

Partitioning member 20 is mounted in foundation 38 to partition lower vent chamber 45 into a central region 47 communicating with upper vent chamber 43 through a central passageway 72 formed in valve 18 and an outer annular region 49 communicating with rollover valve chamber 34 through foundation opening 48, and a central passageway formed in partitioning member 20. Partitioning member 20 in effect provides a flow shield for diverting flow of fuel vapor discharged from fuel tank 13 through foundation opening 48 to the outer annular region 49 underneath valve 18. Partitioning member 20 includes a radially outwardly-extending skirt 52 and a lower cylindrical wall portion 54, both of which are received for engagement with foundation 38. Partitioning member 20 also includes a conical interior wall 56 formed to include a downwardly facing valve seat 57 and an opening 62. An upper cylindrical wall portion 68 extends upwardly beyond conical interior wall 56. Advantageously, upper cylindrical wall portion 68 includes an annular top edge that provides a valve seat 69 for the underside of valve 18. A second vent opening 60 is formed between lower cylindrical wall portion 54 and upper cylindrical wall portion 68 adjacent skirt 52 to provide a flow path for fuel vapor between inlet 32 and outer annular region 49. Second vent opening 60 is advantageously sized to provide minimum restriction to fuel vapor flow. Indeed, opening 60 preferably extends around nearly the entire circumference of lower cylindrical wall portion 54.

Central region 47 is bounded by conical interior wall 56, upper cylindrical wall portion 68, and valve 18. Central region 47 lies in fluid communication with upper vent chamber 43 by means of the central passageway 72 formed in valve 18 regardless of the position of valve 18. Thus, central region 47 is exposed to the substantially atmospheric pressure or slightly sub-atmospheric pressure extant in the upper vent chamber 43 regardless of the position of valve 18.

Outer annular region 49 is bounded by radially inwardly-extending wall 39, upper cylindrical wall portion 68, and valve 18. Outer annular region 49 receives fuel vapor pressure from the fuel tank 13 by way of fuel vapor venting through opening 48 and subsequently through opening 60 as will be subsequently described in greater detail.

A vacuum-relief valve 64 is positioned underneath conical interior wall 56 in the central passageway formed in partitioning member 20 and sized to control flow through the opening 62 formed in conical interior wall 56. Vacuum-relief valve 64 may be any of a number of well-known conventional relief valves. Vacuum-relief valve 64 may be manufactured from a hard rubber material or other elastomeric material, or may be formed of an appropriate plastic material. A conical compression spring 66 extends between conical portion 46 and the underside of vacuum-relief valve 64 to bias valve 64 into engagement with the downwardly facing valve seat 57 on interior wall 56 to block opening 62. Under strong tank vacuum conditions, vacuum-relief valve 64 is moved away from engagement with the valve seat 57 on interior wall 56 to admit ambient air into fuel tank 13 through openings 62 and 48 as illustrated in FIG. 3.

Valve 18 is positioned to lie within housing 16 approximately at the interface between lower housing portion 26 and upper housing portion 28. Specifically, valve 18 is a flexible diaphragm valve having a peripheral edge 70 trapped between lower housing portion 26 and upper housing portion 28.

Valve 18 is movable between a non-venting position in which valve 18 engages valve seat 69 on the top annular edge of upper cylindrical wall portion 68 as shown in FIG. 1 and a venting position in which valve 18 moves in opposition to spring 22 away from valve seat 69 to allow flow of fuel vapor from outer annular region 49 to upper vent chamber 43 via central region 47 and central passageway 72 as shown in FIG. 2. Advantageously, valve 18 is formed to include a central passageway 72 through which fuel vapor from outer annular region 49 vents to upper vent chamber 43 when valve 18 is moved to its venting position in response to accumulation of fuel vapor pressure in the fuel tank 13.

Preferably, the ratio of the area of central passageway 72 to the area of opening 48 should be about 2:1. In addition, the area bounded by valve seat 69 should preferably be about ¼ or less of the area designated 75. Area 75 is the functional area of valve 18.

Valve 18 includes a central portion 73 around central passageway 72 and an annular outer portion 74 surrounding central portion 73. As used herein, "annular outer portion 74" refers to that portion of valve 18 extending from the walls of housing portions 26, 28 to upper cylindrical wall portion 68. "Central portion 73" refers to the remainder of valve 18 which lies within the circumference described by upper cylindrical wall portion 68. Passageway 72 is thus formed in central portion 73 of valve 18. As shown, a top side of valve 18 is exposed to the pressure in upper vent chamber 43 across both central and annular outer portions 73, 74. As for the opposite bottom side of valve 18, outer annular portion 74 is exposed to the pressure in outer annular region 49 (typically equal to the fuel vapor pressure in the fuel tank 13) while central portion 73 is exposed to the pressure in central region 47 (equal to the pressure in upper vent chamber 43, which is typically atmospheric or slightly sub-atmospheric).

Spring 22 normally biases valve 18 downwardly to its non-venting position as shown, for example, in FIG. 1. Spring 22 is a compression spring that extends between an upper plate 82 adjacent an inside wall of upper housing 28 and a lower plate 84 adjacent diaphragm valve 18. Advantageously, a screw 86 or other adjustment means extends through upper housing 28 to contact upper plate 82. By turning screw 86, one can move upper plate 82 relative to upper housing 28, thereby adjusting the preload on spring 22. Thus, the opening point of valve 18 can be precisely adjusted with no disassembly of apparatus 10 or alteration of internal parts merely by turning screw 86 relative to housing 16.

Rollover valve 24 is designed to move in response to vehicle tilting beyond a predetermined angle to engage conical section 46 to block flow of fuel vapor from interior region 34 through opening 48. In its normal unblocking position, rollover valve 24 is positioned in proximity to conical portion 46 but does not engage conical portion 46 or block opening 48. Thus, in this condition, fuel vapor entering interior region 34 through inlet 32 can pass through opening 48 without restriction.

Operation of apparatus 10 during vehicle operation at low fuel tank pressures, or while the vehicle engine is off, is illustrated in FIG. 1. Assuming no rollover condition, rollover valve 24 is positioned spaced apart from conical portion 46. Thus, fuel vapor developing in the fuel tank can pass through inlet 32, into rollover valve chamber 34, and then into the central passageway formed in partitioning member 20 through opening 48 as indicated by flow arrow 88.

Fuel vapor then passes through openings 60 formed in partitioning member 20 to reach outer annular region 49 as indicated by flow arrows 90. However, because valve 18 is in its non-venting position in engagement with annular valve seat 69, fuel vapor in outer annular region 49 impinging on outer annular portion 74 of valve 18 is prevented from reaching central region 47 central passageway 72 and ultimately flowing to canister 14 through line 37.

Specifically, the pressure exerted by fuel vapor in outer annular region 49 impinging upon outer annular portion 74 of valve 18 is insufficient to overcome the opposing biasing force of spring 22 (along with any small resistive forces in the diaphragm material itself). If the engine is off, the pressure in upper vent chamber 43 will be approximately atmospheric. Thus, outer annular portion 74 of valve 18 will be exposed to atmospheric pressure on its upper side (the side facing into upper vent chamber 43) and low fuel vapor pressure from the fuel tank 13 on its lower side (the side facing into outer annular region 49). By contrast, central portion 73 of valve 18 will be exposed to atmospheric pressure on both sides because flow from upper vent chamber 43 downwardly into central region 47 through central passageway 72 is never restricted, such that the pressure in upper vent chamber 43 and in central region 73 is equal. Valve 18 may thus be said to be "atmospherically balanced."

If the engine is running, a light vacuum (for example, 2 to 3 inches of water) will be applied to canister 24 to withdraw vapors from canister 24 for reuse in the engine 15. Because canister 24 is in fluid communication with upper vent chamber 43 by way of housing outlet 36 and line 37, the light vacuum is also applied to upper vent chamber 43 and hence to central region 73. Effectively, the vacuum lowers the amount of fuel vapor pressure required to move valve 18 from its non-venting position to its venting position. As shown in FIG. 1, however, the pressure of fuel vapor in outer annular region 49 is still too low to move valve 18 away from its non-venting position in opposition to spring 22.

As shown in FIG. 2, during continued vehicle operation, fuel vapor pressure in the fuel tank 13 may rise, and fuel vapor pressure may thus build up sufficiently in outer annular region 49 to move valve 18 away from valve seat 69 toward its venting position. With valve 18 so positioned, fuel vapor in outer annular region 49 can flow around the end of upper cylindrical wall portion 68 into central region 73 as indicated by flow arrow 92. From there, fuel vapor can flow through central passageway 72 (as indicated by flow arrow 94) and on through upper vent chamber 43 (as indicated by flow arrow 96) to reach outlet 36, and, eventually, canister 14. Because the light vacuum is continuously applied to upper vent chamber 43 during engine operation, fuel vapor venting through upper vent chamber 43 is advantageously "pulled" toward outlet 32, assisting in rapid and complete venting.

Of course, as fuel vapor vents from outer annular region 49, the pressure in that region will gradually decrease, and, concomitantly, the force applied to outer annular portion 74 of valve 18 will likewise decrease. Advantageously, then, valve 18 acts as a self-limiting valve under continued flow, balancing itself in the non-venting position and eventually moving under the force applied by spring 22 to the non-venting position when the pressure in outer annular region 49 has fallen below a preselected level. The apparatus of the present invention is particularly advantageous because it performs as a self-limiting valve under continued vapor flow while still providing rapid movement from the non-venting position to the venting position during initial vapor flow at pressures above the preselected pressure.

Of course, it is not necessary for the engine to be running in order for venting to occur through apparatus 10. It is possible that when the vehicle is stationary with the engine 15 off, the vehicle may be subjected to conditions which cause an unexpected rise in fuel vapor pressure in the fuel tank 13. Because the engine 15 is off and therefore no vacuum is applied to upper vent chamber 43, fuel vapor pressure must build up in outer annular region 49 to a level above the preselected level to open valve 18. However, when fuel vapor pressure does reach this level, the fuel vapor pressure alone will overcome the opposing biasing force of spring 22 and will move valve 18 away from valve seat 69 to a venting position allowing venting through central passageway 72 to upper vent chamber 43 and outlet 36 to canister 14.

It is contemplated that auxiliary sealing beads (not shown) could be formed in outer annular region 49 to extend between radially inwardly-extending wall 39 and outer annular portion 74 of valve 18. By using such sealing beads, one could alter the volume of outer annular region 49, or, more precisely, one could alter the area of outer annular portion 74 exposed to fuel vapor in outer annular region 49. This would change the pressure balance on valve 18, thus providing a different opening point for valve 18.

Operation of apparatus 10 in response to sub-atmospheric fuel vapor pressures in the fuel tank 13 is illustrated in FIG. 3. As shown, the pressure in upper vent chamber 43, and hence in central region 73 and at opening 62, is approximately atmospheric. Atmospheric pressure is communicated to the tip of vacuum-relief valve 64 exposed to central region 73. However, the underside of vacuum-relief valve 64 is exposed to sub-atmospheric pressure communicated from the fuel tank 13 by way of inlet 32 and opening 48. Thus, when the fuel tank pressure drops sufficiently below atmospheric, the pressure in central region 73 applied to the tip of vacuum relief valve 64 moves vacuum-relief valve 64 in opposition to spring 66, allowing air in upper vent chamber 43 to flow through opening 62 (as indicated by flow arrows 98, 100, 102, 104) to pass through opening 48 (as indicated by flow arrow 106) to eventually reach the fuel tank 13.

Although the invention has been described in detail with reference to certain preferred embodiments, variations and modifications exist within the scope and spirit of the invention as described and defined in the following claims.

I claim:

1. An apparatus for controlling venting of fuel vapor from a vehicle fuel tank, the apparatus comprising a housing formed to include inlet means for receiving fuel vapor from the vehicle fuel tank and outlet means for discharging vapor to a vapor treatment device, a valve movable in the housing and cooperating therewith to define a first vent chamber receiving fuel vapor from the fuel tank through the inlet means and a second vent chamber discharging fuel vapor to the outlet means and exposed to pressure from the vapor treatment device, the valve including a central portion, an outer annular portion, and a first vent opening formed in the central portion to communicate fuel vapor from the first vent chamber to the second vent chamber, a partitioning member positioned in the first vent chamber, the partitioning member partitioning the first vent chamber into a central region exposed to pressure from the second vent chamber and an outer annular region exposed to fuel vapor pressure from the inlet means, the partitioning member being formed to include a second vent opening providing a flow path between the inlet means and the outer annular region, a spring normally biasing the valve into engagement with the partitioning member to block flow of fuel vapor from the first vent chamber through the first vent opening to the second vent chamber, and means for adjusting the tension on the spring.

2. The apparatus of claim 1, wherein the partitioning member includes an upper wall portion providing a valve seat for the valve and an interior wall surrounded by the upper wall portion and formed to include a third vent opening providing a flow path between the inlet means and the central region, 3. The apparatus of claim 9, wherein the upper wall portion cooperates with the interior wall and the central portion of the valve to define the central region.

4. The apparatus of claim 3, further comprising a foundation member receivable in snap-fitting engagement with the housing and surrounding the lower wall portion.

5. The apparatus of claim 4, wherein the housing includes a top wall overlying the spring plate, the spring plate and the spring being arranged to lie between the top wall and the valve, the top wall is formed to include an aperture, and the moving means is supported for movement in the aperture formed in the top wall.

6. The apparatus of claim 5, wherein the moving means includes a screw movable in the aperture and in threaded engagement with the housing and the screw includes a tip contacting the spring plate and a head lying outside of the second vent chamber for turning the screw in the aperture to advance the tip toward and away from the valve to adjust the tension on the spring acting between the spring plate and the valve.

7. The apparatus of claim 5, wherein the housing further includes a side wall lying between the top wall and the valve and defining a boundary of the second vent chamber and the side wall is formed to include the outlet means.

8. The apparatus of claim 4, wherein the spring is a coiled compression spring.

9. An apparatus for controlling venting of fuel vapor from a vehicle fuel tank, the apparatus comprising
   a housing formed to include inlet means for receiving fuel vapor from the vehicle fuel tank and outlet means for discharging vapor to a vapor treatment device,
   a valve movable in the housing and cooperating therewith to define a first vent chamber receiving fuel vapor from the fuel tank through the inlet means and a second vent chamber discharging fuel vapor to the outlet means and exposed to pressure from the vapor treatment device, the valve including a central portion, an outer annular portion, and a first vent opening formed in the central portion to communicate fuel vapor from the first vent chamber to the second vent chamber,
   a partitioning member positioned in the first vent chamber, the partitioning member partitioning the first vent chamber into a central region exposed to pressure from the second vent chamber and an outer annular region exposed to fuel vapor pressure from the inlet means, the partitioning member being formed to include a second vent opening providing a flow path between the inlet means and the outer annular region,
   a spring normally biasing the valve into engagement with the partitioning member to block flow of fuel vapor from the first vent chamber through the first vent opening to the second vent chamber, and
   a foundation member receivable in snap-fitting engagement with the housing, the partitioning member further including a circumferential tab engaging the foundation member and lying adjacent the second vent opening.

10. An apparatus for controlling venting of fuel vapor from a vehicle fuel tank, the apparatus comprising
    a housing formed to include inlet means for receiving fuel vapor from the vehicle fuel tank and outlet means for discharging vapor to a vapor treatment device,
    a valve movable in the housing and cooperating therewith to define a first vent chamber receiving fuel vapor from the fuel tank through the inlet means and a second vent chamber discharging fuel vapor to the outlet means and exposed to pressure from the vapor treatment device, the valve including a central portion, an outer annular portion, and a first vent opening formed in the central portion to communicate fuel vapor from the first vent chamber to the second vent chamber,
    a partitioning member positioned in the first vent chamber, the partitioning member partitioning the first vent chamber into a central region exposed to pressure from the second vent chamber and an outer annular region exposed to fuel vapor pressure from the inlet means, the partitioning member being formed to include a second vent opening providing a flow path between the inlet means and the outer annular region,
    a spring normally biasing the valve into engagement with the partitioning member to block flow of fuel vapor from the first vent chamber through the first vent opening to the second vent chamber, the partitioning member including an upper wall portion providing a valve seat for the valve and a lower wall portion, and the second vent opening being formed between the upper wall portion and the lower wall portion, and
    a foundation member receivable in snap-fitting engagement with the housing and surrounding the lower wall portion.

11. An apparatus for controlling venting of fuel vapor from a vehicle fuel tank, the apparatus comprising
    a housing formed to include inlet means for receiving fuel vapor from the vehicle fuel tank and outlet means for discharging vapor to a vapor treatment device,
    a valve movable in the housing and cooperating therewith to define a first vent chamber receiving fuel vapor from the fuel tank through the inlet means and a second vent chamber discharging fuel vapor to the outlet means and exposed to pressure from the vapor treatment device, the valve including a central portion, an outer annular portion, and a first vent opening formed in the central portion to communicate fuel vapor from the first vent chamber to the second vent chamber,
    a partitioning member positioned in the first vent chamber, the partitioning member partitioning the first vent chamber into a central region exposed to pressure from the second vent chamber and an outer annular region exposed to fuel vapor pressure from the inlet means, the partitioning member being formed to include a second vent opening providing a flow path between the inlet means and the outer annular region, and
    a spring normally biasing the valve into engagement with the partitioning member to block flow of fuel vapor from the first vent chamber through the first vent opening to the second vent chamber, the partitioning member including an upper wall portion providing a valve seat for the valve, a lower wall portion, and an interior wall cooperating with the lower wall portion to define a relief valve chamber, the second vent opening communicating fuel vapor pressure from the relief valve chamber to the outer annular region.

12. The apparatus of claim 11, wherein the second vent opening is a side-discharge opening formed between the upper wall portion and the lower wall portion and arranged to vent fuel vapor pressure in a radially extending direction.

13. An apparatus for controlling venting of fuel vapor from a vehicle fuel tank, the apparatus comprising a housing formed to include inlet means for receiving fuel vapor from the vehicle fuel tank and outlet means for discharging vapor to a vapor treatment device, a valve movable in the housing and cooperating therewith to define a first vent chamber receiving fuel vapor from the fuel tank through the inlet means and a second vent chamber discharging fuel vapor to the outlet means and exposed to pressure from the vapor treatment device, the valve including a central portion, an outer annular portion, and a first vent opening formed in the central portion to communicate fuel vapor from the first vent chamber to the second vent chamber, a partitioning member positioned in the first vent chamber, the partitioning member partitioning the first vent chamber into a central region exposed to pressure from the second vent chamber and an outer annular region exposed to fuel vapor pressure from the inlet means, the partitioning member being formed to include a second vent opening providing a flow path between the inlet means and the outer annular region, a spring normally biasing the valve into engagement with the partitioning member to block flow of fuel vapor from the first vent chamber through the first vent opening to the second vent chamber, the partitioning member being formed to include a relief valve chamber, and a vacuum-relief valve movable in the relief valve chamber between a closed position blocking flow between the relief valve chamber and the central region and an open position allowing flow between the relief valve chamber and the central region.

14. The apparatus of claim 13, further comprising means for biasing the vacuum-relief valve toward its closed position, the biasing means extending through the relief valve chamber.

15. The apparatus of claim 13, wherein the partitioning member includes an interior wall formed to include an opening, the interior wall providing a relief valve seat for engagement by the vacuum-relief valve when the vacuum-relief valve moves to its closed position blocking flow between the relief valve chamber and the central region through the opening.

16. An apparatus for controlling venting of fuel vapor from a vehicle fuel tank, the apparatus comprising a housing formed to include inlet means for receiving fuel vapor from the vehicle fuel tank and outlet means for discharging vapor to a vapor treatment device, a valve movable in the housing and cooperating therewith to define a first vent chamber receiving fuel vapor from the fuel tank through the inlet means and a second vent chamber discharging fuel vapor to the outlet means and exposed to pressure from the vapor treatment device, the valve including a central portion, an outer annular portion, and a first vent opening formed in the central portion to communicate fuel vapor from the first vent chamber to the second vent chamber, a partitioning member positioned in the first vent chamber, the partitioning member partitioning the first vent chamber into a central region exposed to pressure from the second vent chamber and an outer annular region exposed to fuel vapor pressure from the inlet means, the partitioning member being formed to include a second vent opening providing a flow path between the inlet means and the outer annular region, a spring normally biasing the valve into engagement with the partitioning member to block flow of fuel vapor from the first vent chamber through the first vent opening to the second vent chamber, a partitioning member including an upper wall portion providing a valve seat for the valve, the partitioning member including an interior wall, the upper wall portion cooperating with the interior wall and the central portion of the valve to define the central region, the interior wall being formed to include an opening communicating ambient air from the central region to the inlet means to provide vacuum relief when the pressure in the vehicle fuel tank drops to below a predetermined level.

17. An apparatus for controlling venting of fuel vapor from a vehicle fuel tank, the apparatus comprising a housing formed to include an interior region, inlet means for admitting fuel vapor into the interior region from the vehicle fuel tank and outlet means for discharging vapor to a vapor treatment device, a valve movable in the interior region in response to fuel vapor pressure from the vehicle fuel tank between a non-venting position blocking flow of fuel vapor between the inlet means and the outlet means and a venting position allowing flow of fuel vapor between the inlet means and the outlet means, the valve including a central portion, an outer annular portion, and a vent opening formed in the central portion, means for blocking the vent opening upon engagement by the valve when the valve moves to the non-venting position so that fuel vapor from the fuel tank is prevented from flowing through the vent opening to the outlet, the blocking means partitioning the interior region into a central region exposed to fuel vapor pressure from the outlet means and an outer annular region exposed to fuel vapor pressure from the inlet means, the blocking means being formed to include an opening providing a flow path for fuel vapor between the inlet means and the outer annular region, the blocking means being formed to include a relief valve chamber, means for biasing the valve into engagement with the valve seat to place the valve in its non-venting position so that fuel vapor is blocked from flowing through the vent opening at fuel vapor pressures lower than a predetermined pressure and a vacuum-relief valve positioned in the relief valve chamber and movable between a closed position blocking flow between the relief valve chamber and the central region and an open position allowing flow between the relief valve chamber and the central region.

18. The apparatus of claim 17, wherein the blocking means includes an upper wall portion providing a valve seat for the valve and a lower wall portion, and the opening is formed between the upper and lower wall portions.

19. The apparatus of claim 17, wherein the blocking means includes an upper wall portion providing a valve seat for the valve and a lower wall portion, and further comprising a foundation member receivable in snap-fitting engagement with the housing and surrounding the lower wall portion.

20. The apparatus of claim 17, further comprising means for biasing the vacuum-relief valve toward its closed position, the biasing means extending through the relief valve chamber.

21. The apparatus of claim 17, wherein the blocking means includes an interior wall formed to include an opening, the interior wall providing a relief valve seat for engagement by the vacuum-relief valve when the vacuum-relief valve moves to its closed position blocking flow between the relief valve chamber and the central region through the opening.

22. The apparatus of claim 17 wherein the blocking means includes an upper wall portion providing a valve seat for the valve and an interior wall, and the upper wall portion and the interior wall cooperate to define the central region.

23. The apparatus of claim 22, wherein the interior wall is formed to include an opening communicating ambient air from the central region to the inlet to provide vacuum relief when the pressure in the vehicle fuel tank drops to below a predetermined level.

24. The apparatus of claim 17, wherein the blocking means includes an upper wall portion providing a valve seat for the valve.

25. The apparatus of claim 17, further comprising means for adjusting the tension on the biasing means.

26. The apparatus of claim 25, wherein the adjusting means further includes a spring plate lying in the interior region of the housing and engaging the biasing means, the biasing means acting between the spring plate and the valve and means for moving the spring plate relative to the valve to adjust the tension on the biasing means.

27. The apparatus of claim 26, wherein the housing includes a top wall overlying the spring plate, the spring plate and the biasing means being arranged to lie between the top wall and the valve, the top wall is formed to include an aperture, and the moving means is supported for movement in the aperture formed in the top wall.

28. The apparatus of claim 27, wherein the moving means includes a screw movable in the aperture and in threaded engagement with the housing and the screw includes a tip contacting the spring plate and a head lying outside of the second vent chamber for turning the screw in the aperture to advance the tip toward and away from the valve to adjust the tension on the biasing means acting between the spring plate and the valve.

29. The apparatus of claim 17, wherein the biasing means includes a first and a second spring plate and a spring extending through the interior region between the first and second spring plates, and further comprising means for moving the first spring plate relative to the second spring plate to adjust the tension on the spring.

30. The apparatus of claim 17, wherein the blocking means includes an interior wall formed to include an opening, the interior wall providing a relief valve seat for engagement by the vacuum-relief valve when the vacuum-relief valve moves to its closed position blocking flow between the relief valve chamber and the central region through the opening.

31. An apparatus for controlling venting of fuel vapor from a vehicle fuel tank, the apparatus comprising
a housing formed to include an interior region, inlet means for receiving fuel vapor from the vehicle fuel tank and outlet means for discharging vapor to a vapor treatment device,
a valve movable in the housing in response to fuel vapor pressure from the vehicle fuel tank between a non-venting position blocking flow of fuel vapor from the inlet means through the interior region to the outlet means and a venting position allowing flow of fuel vapor from the inlet through the interior region to the outlet means, the valve being formed to include a vent opening communicating fuel vapor to the outlet,
a cylindrical insert positioned in the housing between the inlet means and the valve, the insert including a lower cylindrical wall portion, an interior wall, and an upper cylindrical wall portion integral with the lower cylindrical wall portion and extending from the interior wall to provide a valve seat for the valve, the upper cylindrical wall portion having a diameter greater than the diameter of the opening so that the upper cylindrical wall portion surrounds the opening and blocks flow of fuel vapor therethrough when the valve engages the valve seat,
a spring biasing the valve toward its closed position, the lower cylindrical wall portion and the interior wall cooperating to define a relief valve chamber, the interior wall being formed to include an opening, and
a vacuum-relief valve movable in the relief valve chamber between a closed position blocking the opening and an open position allowing flow through the opening.

32. An apparatus for controlling venting of fuel vapor from a vehicle fuel tank, the apparatus comprising
a housing formed to include an interior region, inlet means for receiving fuel vapor from the vehicle fuel tank and outlet means for discharging vapor to a vapor treatment device,
a valve movable in the housing in response to fuel vapor pressure from the vehicle fuel tank between a non-venting position blocking flow of fuel vapor from the inlet means through the interior region to the outlet means and a venting position allowing flow of fuel vapor from the inlet through the interior region to the outlet means, the valve being formed to include a vent Opening communicating fuel vapor to the outlet,
a cylindrical insert positioned in the housing between the inlet means and the Valve, the insert including a lower cylindrical wall portion, an interior wall, and an upper cylindrical wall portion integral with the lower cylindrical wall portion and extending from the interior wall to provide a valve seat for the valve, the upper cylindrical wall portion having a diameter greater than the diameter of the opening so that the upper cylindrical wall portion surrounds the opening and blocks flow of fuel vapor therethrough when the valve engages the valve seat, and a spring biasing the valve toward its closed position, the valve including a central portion and an annular outer portion, the vent opening being formed in the central portion, the lower cylindrical wall portion cooperating with the interior wall to define a relief valve chamber, and the lower cylindrical wall portion being formed to include at least one opening communicating flow from the relief valve chamber to the outer annular portion.

33. An apparatus for controlling venting of fuel vapor from a vehicle fuel tank, the apparatus comprising a housing formed to include an interior region, inlet means for receiving fuel vapor from the vehicle fuel tank and outlet means for discharging vapor to a vapor treatment device, a valve movable in the housing in response to fuel vapor pressure from the vehicle fuel tank between a non-venting position blocking flow of fuel vapor from the inlet means through the interior region to the outlet means and a venting position allowing flow of fuel vapor from the inlet through the interior region to the outlet means, the valve being formed to include a vent opening communicating fuel vapor to the outlet, a cylindrical insert positioned in the housing between the inlet means and the valve, the insert including a lower cylindrical wall portion, an interior wall, and an upper cylindrical wall portion integral with the lower Cylindrical wall portion and extending from the interior wall to provide a valve seat for the valve, the upper cylindrical wall portion having a diameter greater than the diameter of the opening so that the upper cylindrical wall portion surrounds the opening and blocks flow of fuel vapor therethrough when the valve engages the valve seat, a spring biasing the valve toward its closed position, and means for adjusting the tension on the spring, the adjusting means including a screw extending through the housing.

34. An apparatus for controlling venting of fuel vapor from a vehicle fuel tank, the apparatus comprising a housing formed to include an interior region, inlet means for receiving fuel vapor from the vehicle fuel tank and outlet means for discharging vapor to a vapor treatment device, a diaphragm valve including an upper side normally exposed to pressure from the vapor treatment device, a lower side normally exposed to fuel vapor pressure from the fuel tank, a central portion, and an outer annular portion, the central portion being formed to include a vent opening, the diaphragm valve being movable between a non-venting position and a venting position, means for blocking the central portion from exposure to fuel vapor pressure from the fuel tank upon engagement by the diaphragm valve so that fuel vapor from the fuel tank is prevented from venting through the vent opening, the blocking means including a valve seat for engagement by the diaphragm valve when the diaphragm valve moves to its non-venting position, the blocking means being formed to include an opening providing a flow path for fuel vapor between the inlet means and the outer annular portion of the diaphragm, a spring normally biasing the diaphragm valve toward its non-venting position, and means for adjusting the tension on the spring.

35. The apparatus of claim 34, further comprising a first and a second spring plate disposed on either end of the spring and the adjusting means includes a screw threadedly engaging the housing for moving the first spring plate relative to the second spring plate to adjust the tension on the spring.

36. An apparatus for controlling venting of fuel vapor from a vehicle fuel tank, the apparatus comprising a housing formed to include an interior region, inlet means for receiving fuel vapor from the vehicle fuel tank and outlet means for discharging vapor to a vapor treatment device, a diaphragm valve including an upper side normally exposed to pressure from the vapor treatment device, a lower side normally exposed to fuel vapor pressure from the fuel tank, a central portion, and an outer annular portion, the central portion being formed to include a vent opening, the diaphragm valve being movable between a non-venting position and a venting position, means for blocking the central portion from exposure to fuel vapor pressure from the fuel tank upon engagement by the diaphragm valve so that fuel vapor from the fuel tank is prevented from venting through the vent opening, the blocking means including a valve seat for engagement by the diaphragm valve when the diaphragm valve moves to its non-venting position, the blocking means being formed to include an opening providing a flow path for fuel vapor between the inlet means and the outer annular portion of the diaphragm, and a spring normally biasing the diaphragm valve toward its non-venting position, the blocking means being formed to include a relief valve chamber, and further comprising a vacuum-relief valve movable in the relief valve chamber between a closed position blocking flow between the relief valve chamber and the central portion of the diaphragm valve and an open position allowing flow between the relief valve chamber and the central portion of the diaphragm valve.

37. The apparatus of claim 36, further comprising means for biasing the vacuum-relief valve toward its closed position, the biasing means extending through the relief valve chamber.

38. The apparatus of claim 36, wherein the blocking means includes an interior wall formed to include an opening, the interior wall providing a relief valve seat for engagement by the vacuum-relief valve when the vacuum-relief valve moves to its closed position blocking flow between the relief valve chamber and the central portion through the opening.

39. An apparatus for controlling the venting of fuel vapors from a vehicle fuel tank, the apparatus comprising a housing formed to include an interior region, inlet means for receiving fuel vapor from the fuel tank and outlet means for discharging fuel vapor to a vapor treatment device, a valve disposed in the housing and formed to include a vent opening, the valve being movable in response to fuel vapor pressure from the vehicle fuel tank between a non-venting position blocking flow of fuel vapor between the inlet means and the outlet means through the vent opening and a venting position allowing flow of fuel vapor between the inlet means and the outlet means through the vent opening, means for providing a valve seat for the valve, the providing means surrounding the vent opening to prevent fuel vapor from the fuel tank from passing through the vent opening upon engagement by the valve, a spring for biasing the valve into engagement with the providing means to place the valve in its non-venting position, and means for adjusting the tension on the spring.

40. The apparatus of claim 39, further comprising a first and a second spring plate disposed on either end of the spring and the adjusting means includes a screw positioned to move the first spring plate relative to the second spring plate to adjust the tension on the spring.

41. An apparatus for controlling the venting of fuel vapors from a vehicle fuel tan, the apparatus comprising a housing formed to include an interior region, inlet means for receiving fuel vapor from the fuel tank and outlet means for discharging fuel vapor to a vapor treatment device, a valve disposed in the housing and formed to include a vent opening, the valve being movable in response to fuel vapor pressure from the vehicle fuel tank between a non-venting position blocking flow of fuel vapor between the inlet means and the outlet means through the vent opening and a venting position allowing flow of fuel vapor between the inlet means and the outlet means through the vent opening, means for providing a valve seat for the valve, the providing means surrounding the vent opening to prevent fuel vapor from the fuel tank from passing through the vent opening upon engagement by the valve, a spring for biasing the valve into engagement with the providing means to place the valve in its non-venting position, and the providing means partitioning the interior region into a central region exposed to fuel vapor pressure from the outlet means and an outer annular region exposed to fuel vapor pressure from the inlet means, the providing means being formed to include a relief valve chamber, and further comprising a vacuum-relief valve movable in the relief valve chamber between a closed position blocking flow between the relief valve chamber and the central region and an open position allowing flow between the relief valve chamber and the central region.

42. The apparatus of claim 41, further comprising means for biasing the vacuum-relief valve toward its closed position, the biasing means extending through the relief valve chamber.

43. The apparatus of claim 41, wherein the providing means includes an interior wall formed to include an opening, the interior wall providing a relief valve seat for engagement by the vacuum-relief valve when the vacuum-relief valve moves to its closed position blocking flow between the relief valve chamber and the central region through the opening.

* * * * *